United States Patent
Fechtel

(10) Patent No.: US 10,530,504 B2
(45) Date of Patent: Jan. 7, 2020

(54) DEVICE AND METHOD FOR DETECTING CLUSTERS IN BEAMFORMED TRANSMISSION

(71) Applicant: Intel IP Corporation, Santa Clara, CA (US)

(72) Inventor: Stefan Fechtel, Zorneding (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 16/081,586

(22) PCT Filed: Feb. 13, 2017

(86) PCT No.: PCT/EP2017/053125
§ 371 (c)(1),
(2) Date: Aug. 31, 2018

(87) PCT Pub. No.: WO2017/167491
PCT Pub. Date: Oct. 5, 2017

(65) Prior Publication Data
US 2019/0068304 A1 Feb. 28, 2019

(30) Foreign Application Priority Data
Apr. 1, 2016 (DE) .......................... 10 2016 106 008

(51) Int. Cl.
*H04K 1/10* (2006.01)
*H04L 27/28* (2006.01)
(Continued)

(52) U.S. Cl.
CPC .............. *H04B 17/364* (2015.01); *H04B 7/01* (2013.01); *H04B 7/0617* (2013.01);
(Continued)

(58) Field of Classification Search
CPC ...... H04B 17/364; H04B 17/336; H04B 7/01; H04B 7/0413; H04B 7/0617;
(Continued)

(56) References Cited

U.S. PATENT DOCUMENTS 5,404,322 A * 4/1995 Gehring ................. H03H 17/06
708/300
9,065,717 B2 6/2015 Umeda et al.
(Continued)

OTHER PUBLICATIONS

European Patent Office, PCT International Search Report issued for PCT/EP2017/053125, 6 pgs., dated Jul. 25, 2017.
(Continued)

*Primary Examiner* — Phuong Phu
(74) *Attorney, Agent, or Firm* — Schiff Hardin LLP

(57) ABSTRACT

The disclosure relates to a cluster detection device for detecting clusters in a beam-formed transmission, the cluster detection device comprising: a receiver, configured to receive a radio signal comprising time-frequency resources, wherein the time-frequency resources comprise a plurality of reference signals; a delay profile detector, configured to detect a set of delay profiles based on frequency-direction filtering of the plurality of reference signals; a Doppler profile detector, configured to detect a set of delay-Doppler profiles based on time-direction filtering of the set of delay profiles; and a cluster detection postprocessor, configured to derive a set of cluster parameters from the set of delay-Doppler profiles.

21 Claims, 18 Drawing Sheets

(51) Int. Cl.
*H04B 17/364* (2015.01)
*H04L 25/02* (2006.01)
*H04L 27/26* (2006.01)
*H04B 17/336* (2015.01)
*H04B 7/01* (2006.01)
*H04B 7/06* (2006.01)
*H04L 5/00* (2006.01)
*H04B 7/0413* (2017.01)

(52) U.S. Cl.
CPC ......... *H04B 17/336* (2015.01); *H04L 5/0048* (2013.01); *H04L 25/0224* (2013.01); *H04L 27/2628* (2013.01); *H04L 27/2647* (2013.01); *H04B 7/0413* (2013.01)

(58) Field of Classification Search
CPC ............. H04L 25/0224; H04L 27/2647; H04L 5/0048; H04L 27/2628; H04L 25/0204; H04L 25/0212; H03H 17/06

USPC .................................. 375/260, 346, 350, 229
See application file for complete search history.

(56) References Cited

U.S. PATENT DOCUMENTS

2008/0130771 A1\* 6/2008 Fechtel ............... H04L 25/0212
375/260
2008/0240265 A1\* 10/2008 Fechtel ............... H04L 25/0204
375/260

OTHER PUBLICATIONS

Nguyen, et al., "On the Eigenfilter Design Method and It's Applications: A Tutorial", IEEE Transactions on Circuits and Systems II, vol. 50, No. 9, 21 pgs., Sep. 1, 2003.

\* cited by examiner

DEVICE AND METHOD FOR DETECTING CLUSTERS IN BEAMFORMED TRANSMISSION

FIELD

The disclosure relates to a device and method for detecting clusters in a beam-formed transmission, in particular cluster detection for sparse channel estimation in 4G and 5G mobile networks. The disclosure further relates to a method for generating a window for filtering a plurality of reference signals comprised in a radio signal.

BACKGROUND

Centimeter- and millimeter-wave communication deals with difficult channels characterized by high path loss, multipath propagation, and blocking. Massive MIMO beamforming (BF) not only compensates for the path loss but also mitigates multipath in the sense that the beam-formed channel, that may be represented by the cascade of transmitter beamformer, physical channel and receiver beamformer "reduces" to an equivalent sparse channel, typically comprising the LOS path 101 and a few reflected NLOS paths 102, 103 or clusters as illustrated in FIGS. 1 and 2, where each cluster is characterized by a cluster power, delay/Doppler shift (possibly large), and a small delay/Doppler spread.

It may thus be desirable to provide a technique for improving communications in such environments as described above.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

FIG. 11b is a diagram 1100b illustrating a transfer function for 1102 the frequency window of FIG. 11a.

FIG. 12b is a diagram 1200b illustrating transfer functions 1211, 1212, 1213, 1214 for the time windows of FIG. 12a.

DETAILED DESCRIPTION

Figure 1:
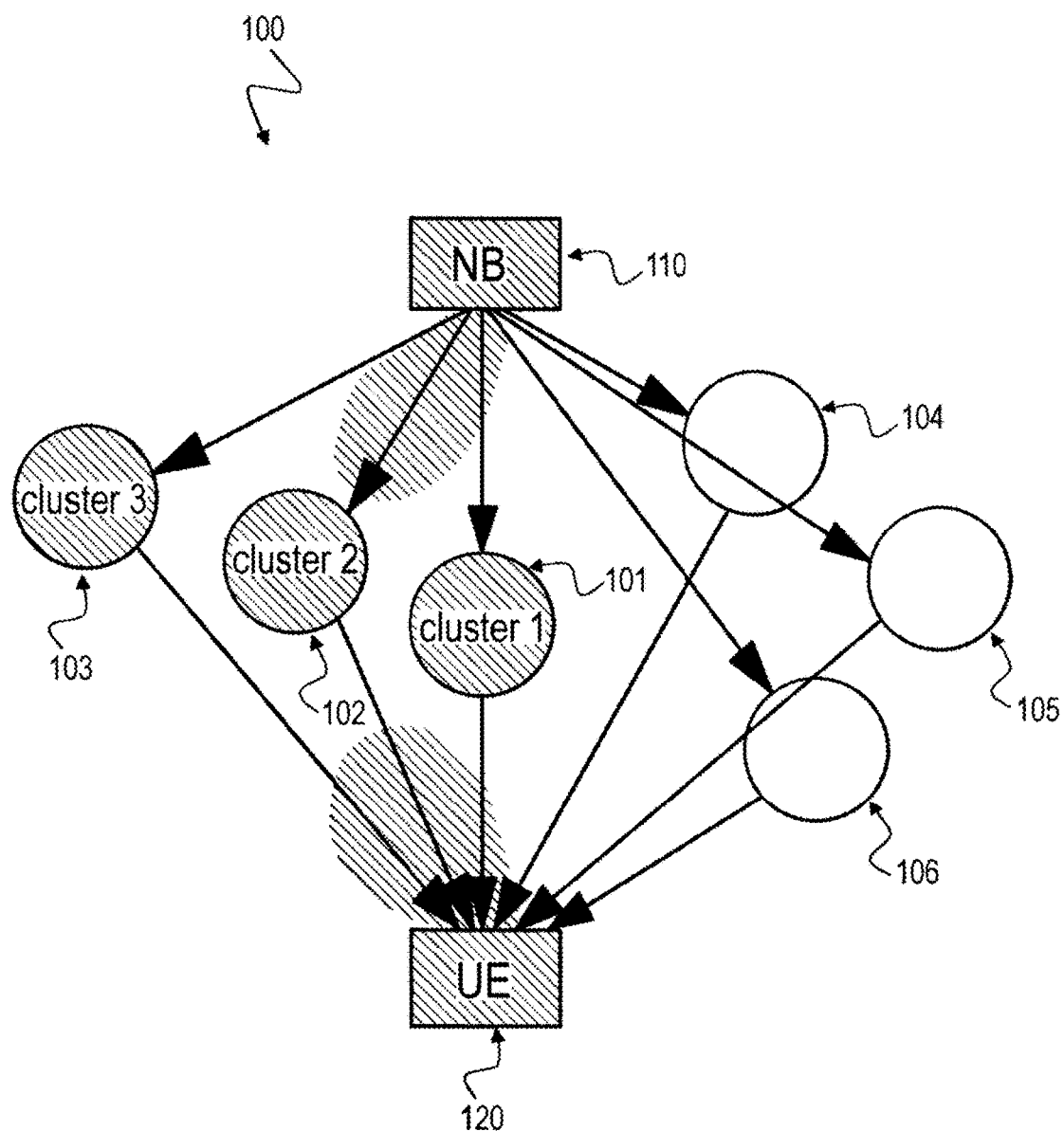
FIG. 1 is a schematic diagram illustrating a sparse beam-formed channel comprising the LOS path 101 and a few reflected NLOS paths 102, 103 or clusters.
Figure 2:
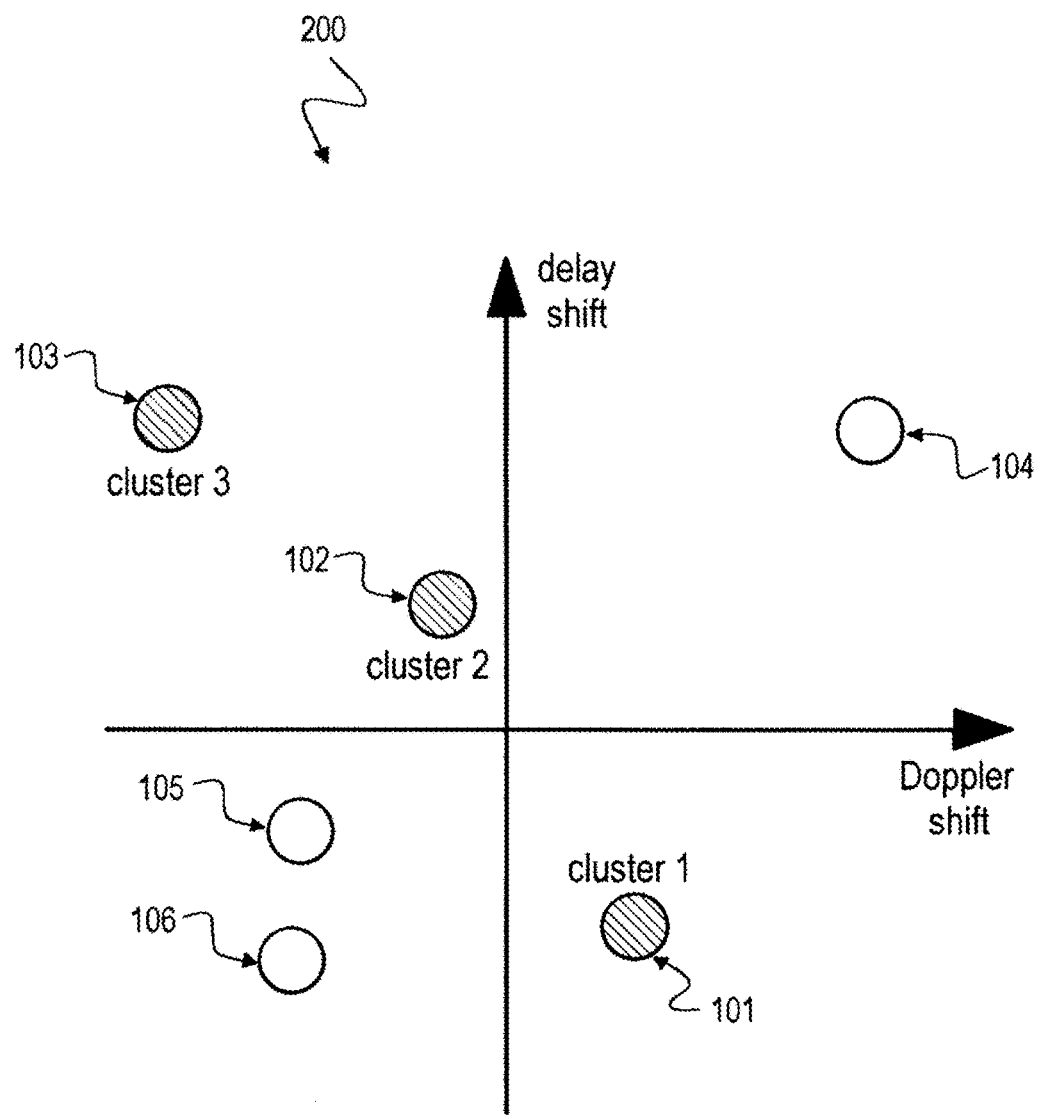
FIG. 2 is a delay-Doppler diagram illustrating the clusters 101, 102, 103 of FIG. 1 in a delay-Doppler plane.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
RS: Reference Signal,
RE: Resource Element,
RB: Resource Block,
PRB: Physical Resource Block,
3GPP: 3rd Generation Partnership Project,
LTE: Long Term Evolution,
LTE-A: LTE Advanced, Release 10 and higher versions of 3GPP LTE,
4G: fourth generation network according to 3GPP,
5G: fifth generation network according to 3GPP,
RF: Radio Frequency,
UE: User Equipment, mobile terminal, mobile device
SINR: signal-to-interference and noise ratio,
RB: resource block, e.g., a resource block in frequency direction times slot in time direction,
OFDM: Orthogonal Frequency Division Multiplex,
NodeB,
eNB: base station, radio cell,
IRC: Interference Rejection Combining,
(e)ICIC: (enhanced) Inter-Cell Interference Coordination,
MIMO: Multiple Input Multiple Output,
CE: Channel Estimation,
BF: Beamforming,
MSE: Mean square error,
LOS: Line of sight, NLOS: Non-line of sight,
DC: Direct current or component at zero Hertz,
DFT: Discrete Fourier Transform,
IDFT: Inverse Discrete Fourier Transform.

The methods and devices described herein may be based on resource blocks, in particular resource blocks received from radio cells, and clusters. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G, 5G LTE and beyond, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in interference aware receivers such as IRC (Interference Rejection Combining) receivers. IRC is a technique that may be used in an antenna diversity system to suppress co-channel interference by using the cross covariance between the noise in diversity channels. The IRC receiver may be based on a minimum mean square error (MMSE) criterion, which may require channel estimation and cluster detection as described hereinafter.

The methods and devices described hereinafter may be applied in MIMO systems and beamforming devices. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. Beamforming devices can be used to form the signal streams transmitted or received over antenna arrays. Such MIMO systems and beamforming devices may include channel estimation and cluster detection as described hereinafter.

Figure 3:
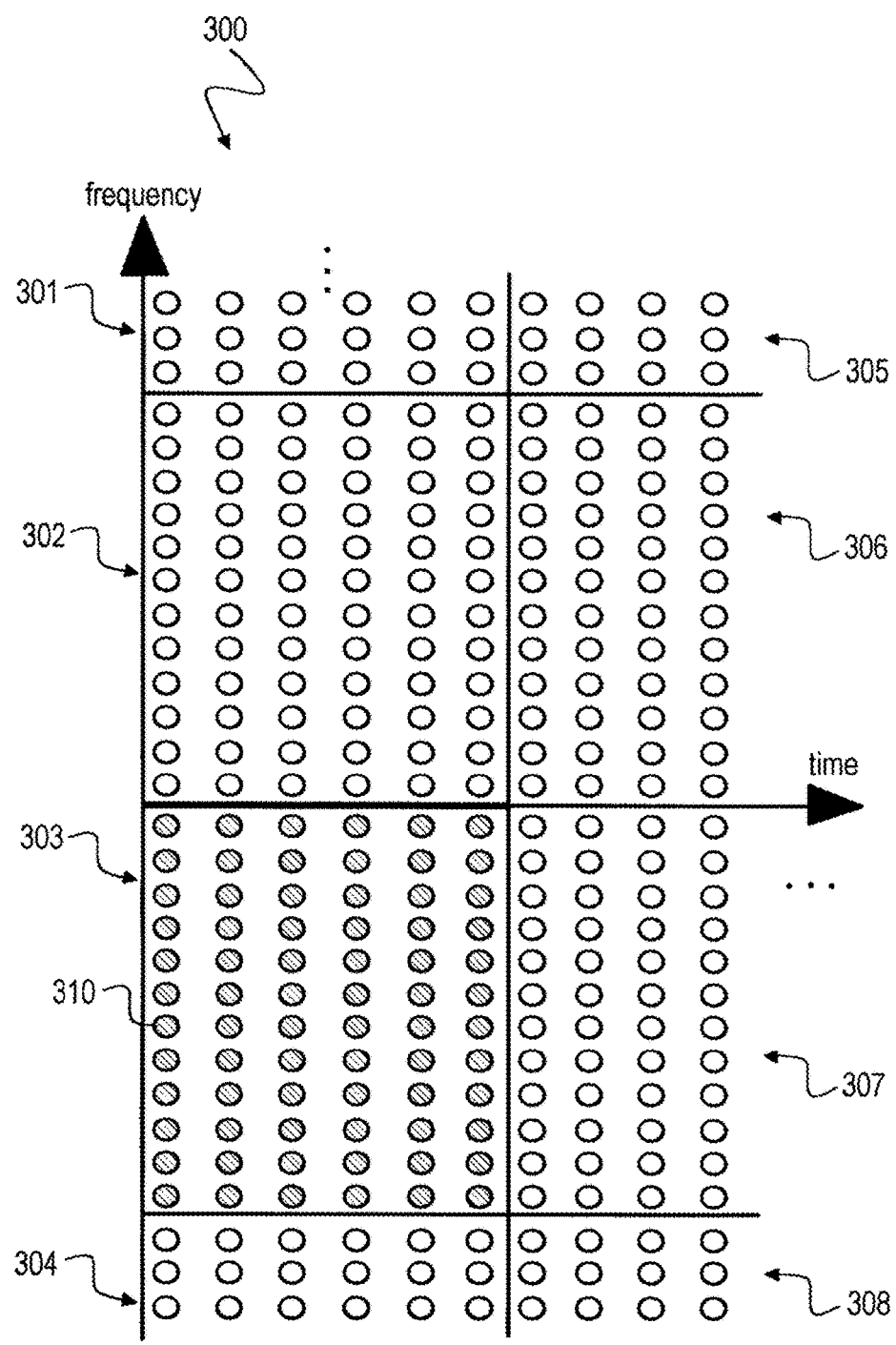
FIG. 3 is a diagram of time frequency resources 300 including a reference symbol pattern 310.

The methods and devices described hereinafter may be applied in 4G and 5G networks and radio signals including different kinds of time-frequency resources, for examples radio resources as illustrated in FIG. 3 which illustrates a schematic diagram of time frequency resources 300 including a reference symbol pattern 310. The time frequency resources 300 may include a plurality of resource blocks 301, 302, 303, 304, 305, 306, 307, 308 for transporting user and control data. Some of these resource blocks may include reference symbols 310 that may be used for channel estimation.

Figure 4:
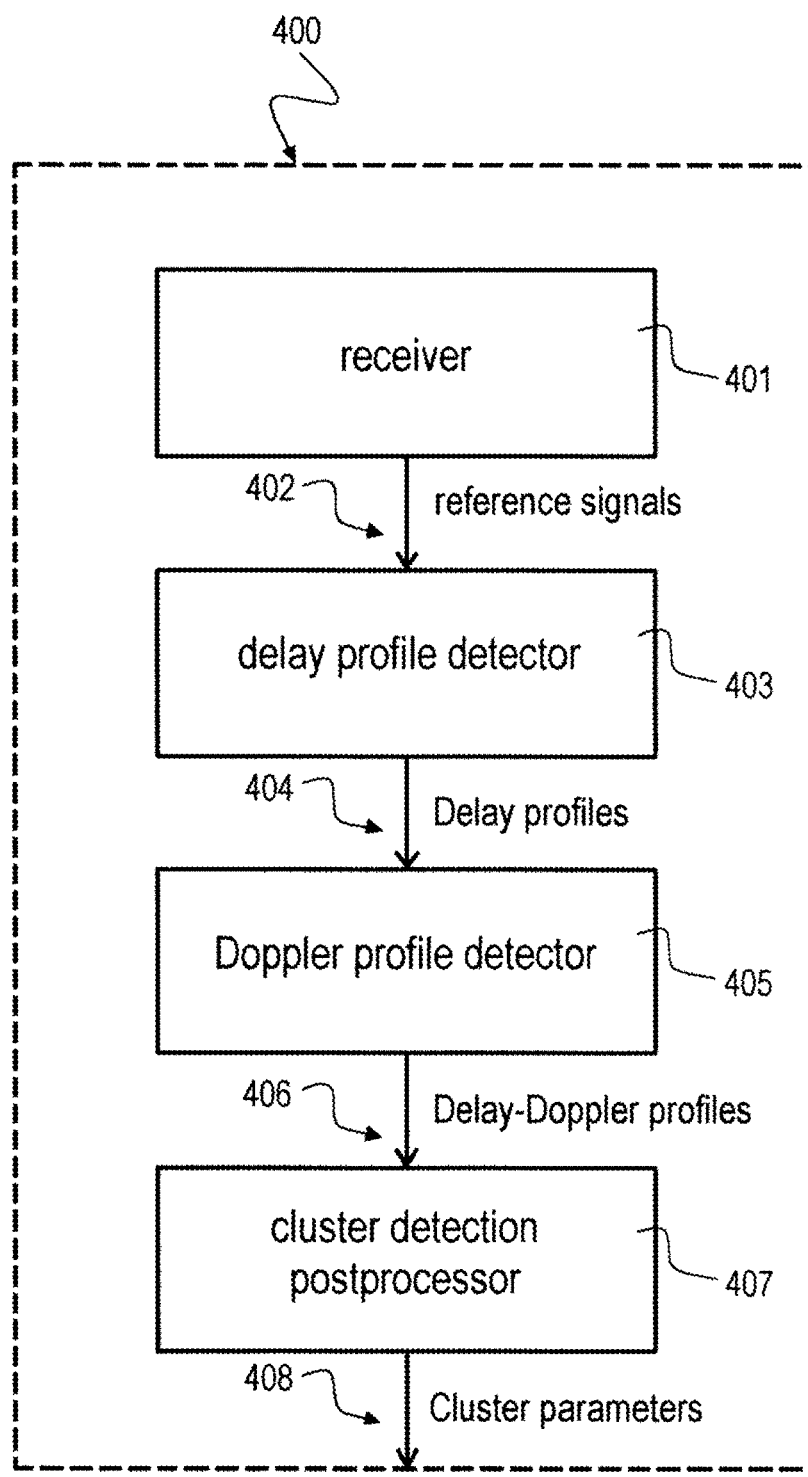
FIG. 4 is a block diagram of an exemplary cluster detection device 400.

FIG. 4 is a block diagram of an exemplary cluster detection device 400. The cluster detection device 400 includes a receiver 401, a delay profile detector 403, a Doppler profile detector 405 and a cluster detection postprocessor 407.

The receiver 401 is configured to receive a radio signal comprising time-frequency resources, e.g. time frequency resources 300 as described above with respect to FIG. 3, wherein the time-frequency resources comprise a plurality of reference signals. The delay profile detector 403 is configured to detect a set of delay profiles 400 based on frequency-direction filtering of the plurality of reference signals 402, e.g. frequency-direction filtering as described below with respect to FIGS. 5, 6 and 7. The Doppler profile detector 405 is configured to detect a set of delay-Doppler profiles 406 based on time-direction filtering of the set of delay profiles 404, e.g. time-direction filtering as described below with respect to FIGS. 5, 6 and 7. The cluster detection postprocessor 407 is configured to derive a set of cluster parameters 408 from the set of delay-Doppler profiles 406, e.g. as described below with respect to FIGS. 5, 6 and 7.

The delay profile detector 403 may include an Inverse Discrete Fourier Transform (IDFT) unit, e.g. an IDFT unit 1003 as described below with respect to FIG. 10, to perform the frequency-direction filtering.

The Doppler profile detector 405 may include a Discrete Fourier Transform (DFT) unit, e.g. a DFT unit 1009 as described below with respect to FIG. 10, to perform the time-direction filtering.

The delay profile detector 405 may include a frequency window unit, e.g. a unit 1001 as described below with respect to FIG. 10, arranged before the IDFT unit 1003, configured to window the plurality of reference signals 402 by a frequency window, e.g. a frequency window as described below with respect to FIG. 11.

The Doppler profile detector 405 may include a time window unit, e.g. a unit 1007 as described below with respect to FIG. 10, arranged before the DFT unit 1009, configured to window the set of delay profiles 404 by a time window, e.g. a time window as described below with respect to FIG. 12.

The time window and/or the frequency window may have a passband defined by a single point at zero and a stopband defined by symmetric real-valued coefficients around the zero, e.g. as described below with respect to FIGS. 10 to 12. The coefficients of the stopband may be configured so as to minimize the energy of the stopband.

The Doppler profile detector 405 may be configured to iteratively detect the set of delay-Doppler profiles 406 based on at least one iteration of frequency-direction filtered reference signals. In a first iteration the Doppler profile detector 405 may be configured to detect the set of delay-Doppler profiles 406 based on a single reference signal.

The cluster detection device 400 may include a memory, e.g. a memory 1005 as described below with respect to FIG. 10, coupled between the delay profile detector 403 and the Doppler profile detector 405. The memory 1005 may be configured to store the set of delay profiles 404.

The time-frequency resources may be arranged in a plurality of resource blocks, e.g. resource blocks 301, 302, 303, 304, 305, 306, 307, 308 as depicted in FIG. 3. The delay profile detector 403 may be configured to process the plurality of reference signals 402 on a resource block basis.

The set of cluster parameters 408 may include a number of clusters and for each cluster: a power level, a delay shift and a Doppler shift, e.g. as described below with respect to FIGS. 6 to 10.

The cluster detection postprocessor 407 may include a power detector, e.g. a power detector 1013 as described below with respect to FIG. 10, configured to detect a power of the set of delay-Doppler profiles 406 based on power averaging.

The cluster detection postprocessor 407 may include a threshold detection unit, e.g. a threshold detection unit 609 as described below with respect to FIG. 6, configured to detect entries of the set of delay-Doppler profiles 406 which are above a threshold. The threshold may depend on a signal-to-noise ratio of the set of delay-Doppler profiles 406. The cluster detection postprocessor 407 may be configured to assign the entries of the set of delay-Doppler profiles 406, which are above the threshold, to clusters. The cluster assignment may be based on relative distances of the entries of the set of delay-Doppler profiles 406 which are above the threshold.

Figure 5:
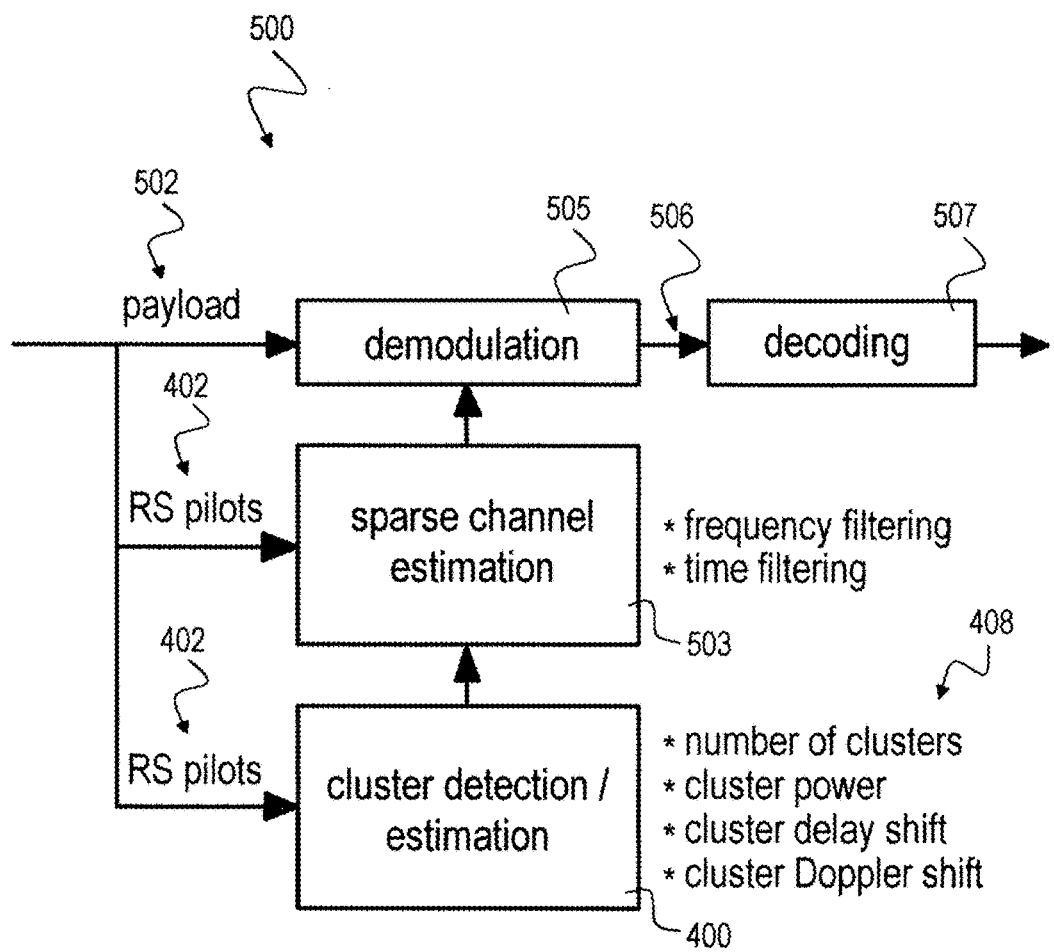
FIG. 5 is a block diagram of a sparse channel estimation device 500 including the cluster detection device of FIG. 4.

FIG. 5 is a block diagram of a sparse channel estimation device 500 including the cluster detection device 400 of FIG. 4. The sparse channel estimation device 500 includes the cluster detection device 400 described above with respect to FIG. 4, a sparse channel estimation device 503 and a demodulation unit 505 and a decoding unit 507. The cluster detection device 400 detects cluster parameters 408 such as number of clusters, cluster power, cluster delay shift and cluster Doppler shift based on evaluating an RS pilot reference signal 402. These cluster parameters 408 are input to the sparse channel estimation device 503 for channel estimation and performing frequency filtering and time filtering. The estimated channel is used by the demodulation unit 505 to demodulate the received payload 502 and by the decoding unit 507 to decode the demodulated payload 506.

Figure 6:
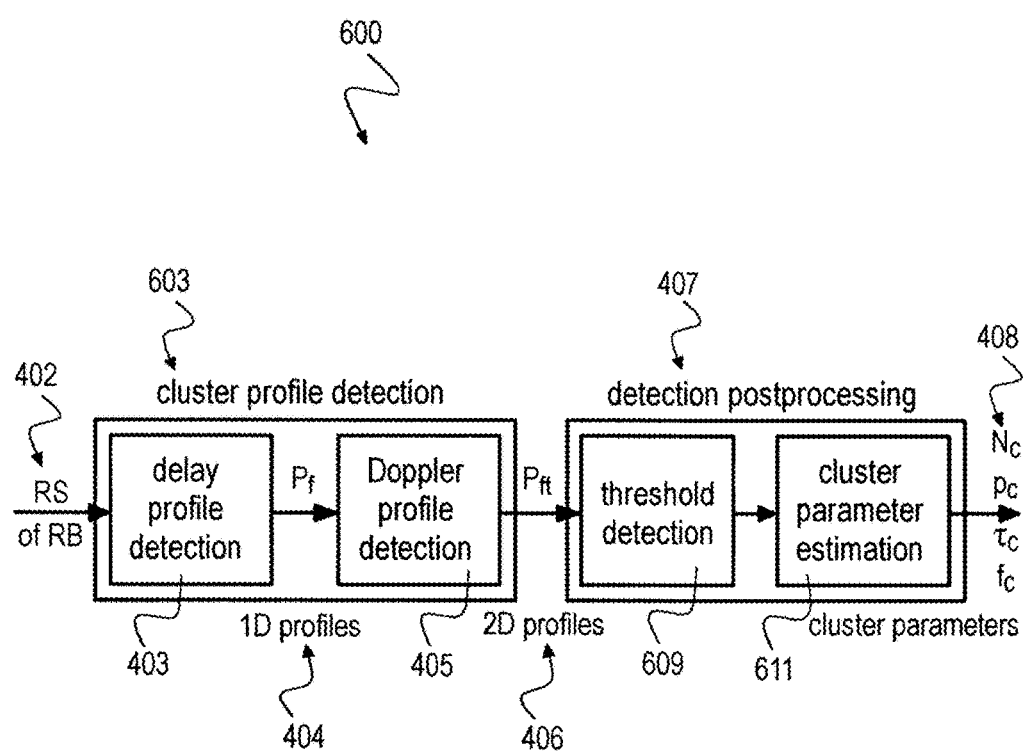
FIG. 6 is a block diagram of an exemplary cluster detection device 600 as an embodiment of the cluster detection device 400 of FIG. 4.

FIG. 6 is a block diagram of an exemplary cluster detection device 600 as an embodiment of the cluster detection device 400 of FIG. 4.

The cluster detection device 600 includes a cluster profile detection module 603 including a delay profile detector 403 and a Doppler profile detector 405 as described above with respect to FIG. 4 and a detection postprocessor 407 as described above with respect to FIG. 4.

The cluster profile detection module 603 may perform generation of 2D delay/Doppler profile estimates $P_{ft}$ 406 from the set of input RS 402 pertaining to a resource block. Preferably, this may be a two-step process: A frequency-direction processing may be configured to compute sets of 1D delay profiles $P_f$ 404 from input RS-OFDM 402, a time-direction processing may be configured to compute 2D delay/Doppler profiles $P_{ft}$ 406 from a series of 1D delay profiles 404 obtained in the first step.

The cluster detection postprocessor 407 may perform detection of clusters and estimation of their parameters $\{N_c,$ $p_c, \tau_c, f_c\}$ 408 from delay/Doppler profiles $P_f, P_{ft}$ 404, 406 generated by the cluster profile detection module 603. This may be an iterative process as illustrated in FIG. 7.

Figure 7:
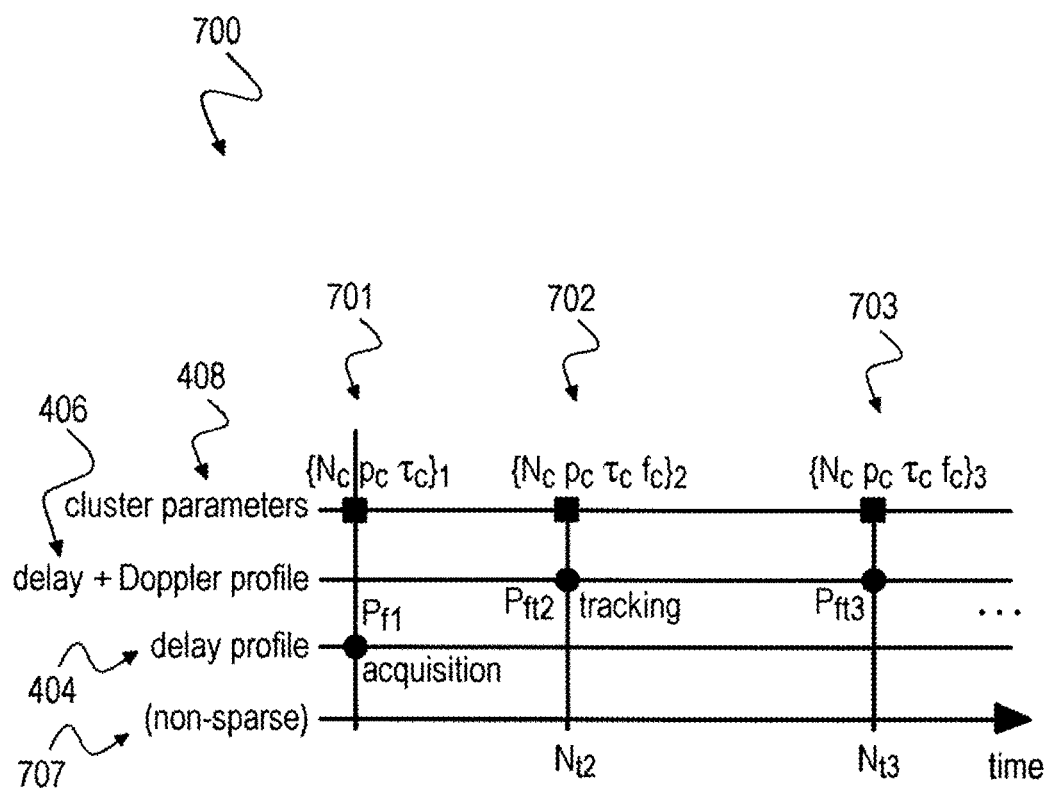
FIG. 7 is a time diagram illustrating iterative cluster detection process 700 according to the disclosure.
Figure 8A:
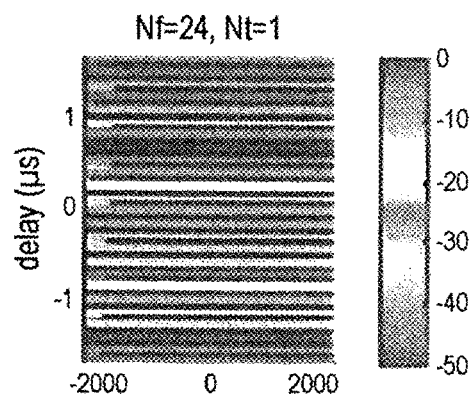
FIGS. 8a, 8b, 8c, 8d, 8e, 8f are exemplary cluster power profiles obtained after various iterations of the iterative cluster detection process 700 of FIG. 7.
Figure 8B:
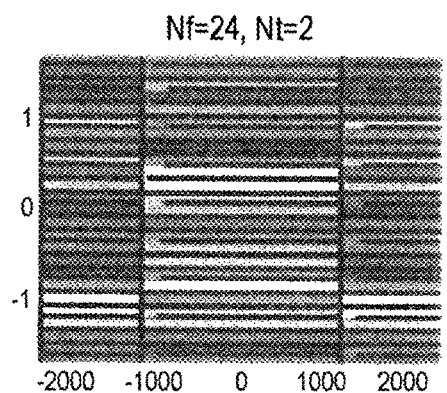
Figure 8C:
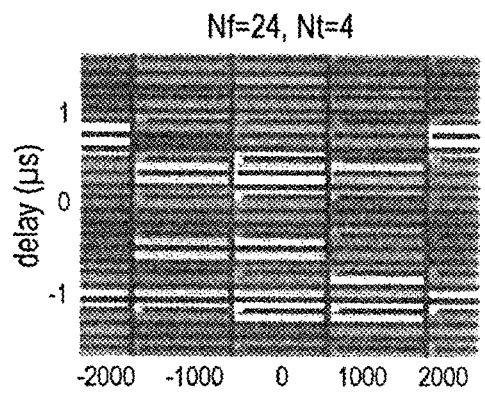
Figure 8D:
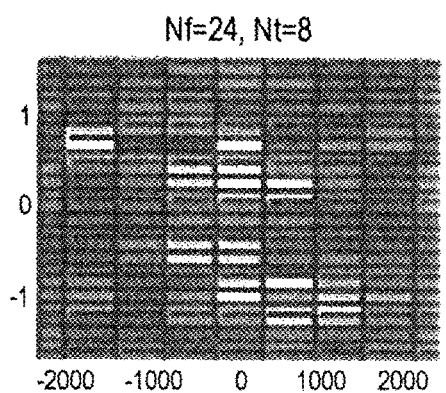
Figure 8E:
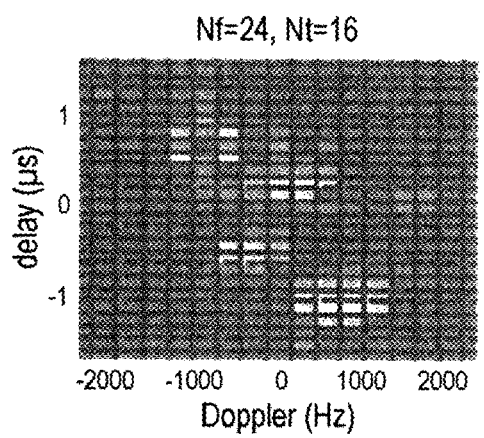
Figure 8F:
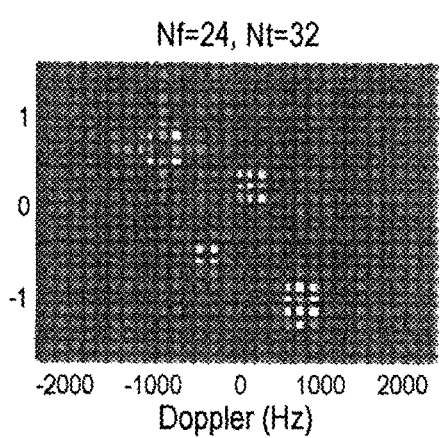
Figure 9A:
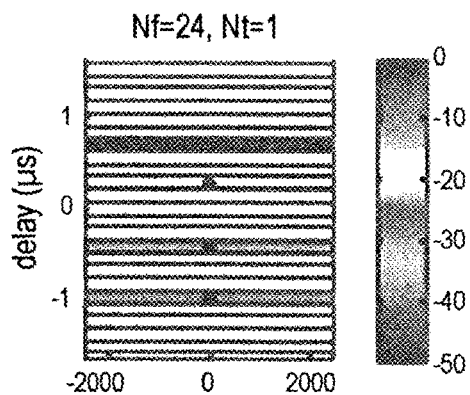
FIGS. 9a, 9b, 9c, 9d, 9e, 9f are exemplary cluster estimates estimated from the respective power profiles of FIGS. 8a, 8b, 8c, 8d, 8e, 8f.
Figure 9B:
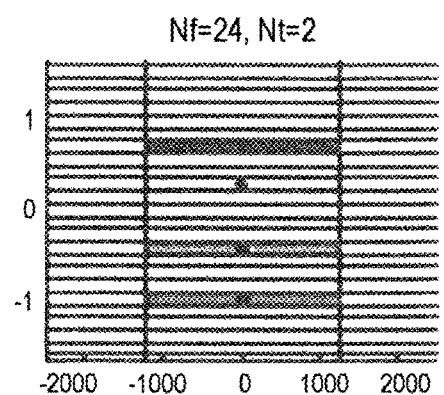
Figure 9C:
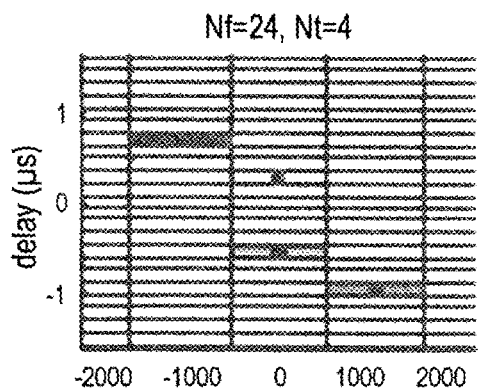
Figure 9D:
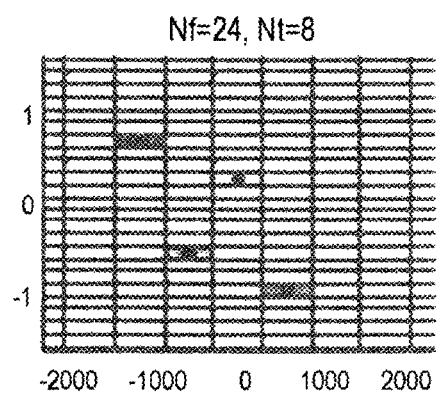
Figure 9E:
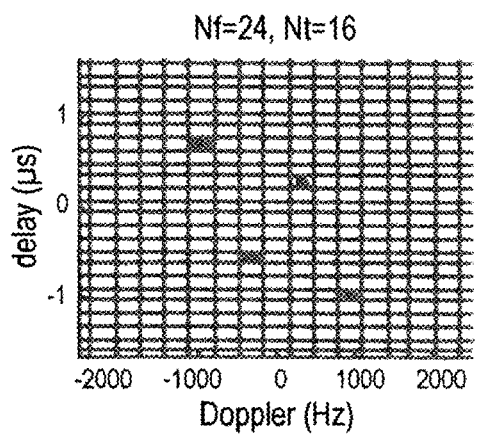
Figure 9F:
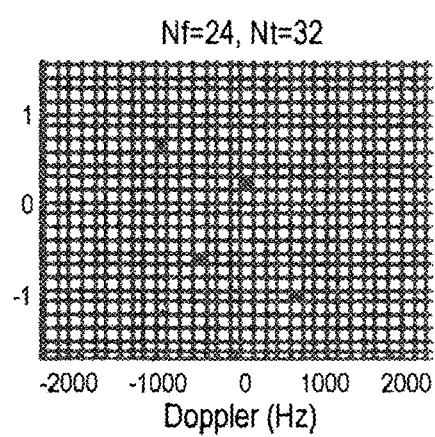

FIG. 7 is a time diagram illustrating iterative cluster detection process 700 according to the disclosure. In an acquisition phase 701, based on the first delay profile $P_f$ 404 a first cluster parameter estimate $\{\hat{N}_c, \hat{p}_c, \hat{\tau}_c\}_1$ may be generated and used to initialize sparse CE filtering. In a tracking phase 702, 703, refined cluster parameter estimates $\{\hat{N}_c, \hat{p}_c, \hat{\tau}_c, \hat{f}_c\}_{2, 3, \ldots}$ may be generated, as further delay/Doppler profiles $P_{ft}$ 406 become available, and used to update sparse CE filtering, e.g. the sparse channel estimator 503 as described above with respect to FIG. 5.

FIGS. 8a, 8b, 8c, 8d, 8e, 8f are exemplary cluster power profiles obtained after various iterations of the iterative cluster detection process 700 of FIG. 7. FIGS. 9a, 9b, 9c, 9d, 9e, 9f are exemplary cluster estimates estimated from the respective power profiles of FIGS. 8a, 8b, 8c, 8d, 8e, 8f.

In FIGS. 8 and 9, the detection of four clusters with power levels [0, −10, −20, −30] dB, in terms of cluster profiles $P_{ft}$ (FIGS. 8a, 8b, 8c, 8d, 8e, 8f) and detected clusters max($\mathbf{P}_{\theta,c}$) (FIGS. 9a, 9b, 9c, 9d, 9e, 9f) is illustrated. Deriving cluster parameters directly from max($\mathbf{P}_{\theta,c}$) was found sufficient and used in simulations (see FIGS. 16a, 16b, 16c). The first estimate $\{\hat{N}_c, \hat{p}_c, \hat{\tau}_c\}$ produced by acquisition $N_t$=1 (see FIGS. 8a, 9a) exhibits high delay resolution and thus enables sparse CE frequency filtering from the onset. Time filtering may initially be non-sparse with large Doppler spread. In order for initialization to be as robust as possible, resource blocks should be sufficiently wide in frequency direction, preferably hosting $N_f \geq 16$ pilots. Further estimates $\{\hat{N}_c, \hat{p}_c, \hat{\tau}_c, \hat{f}_c\}_{2, 3, \ldots}$ produced by tracking for $N_t$=2, 4, . . . (see FIGS. 8b-f and 9b-f) are more robust with increased Doppler resolution, thus enabling increasingly sharp sparse CE time filtering until the end of the resource block.

Figure 10:
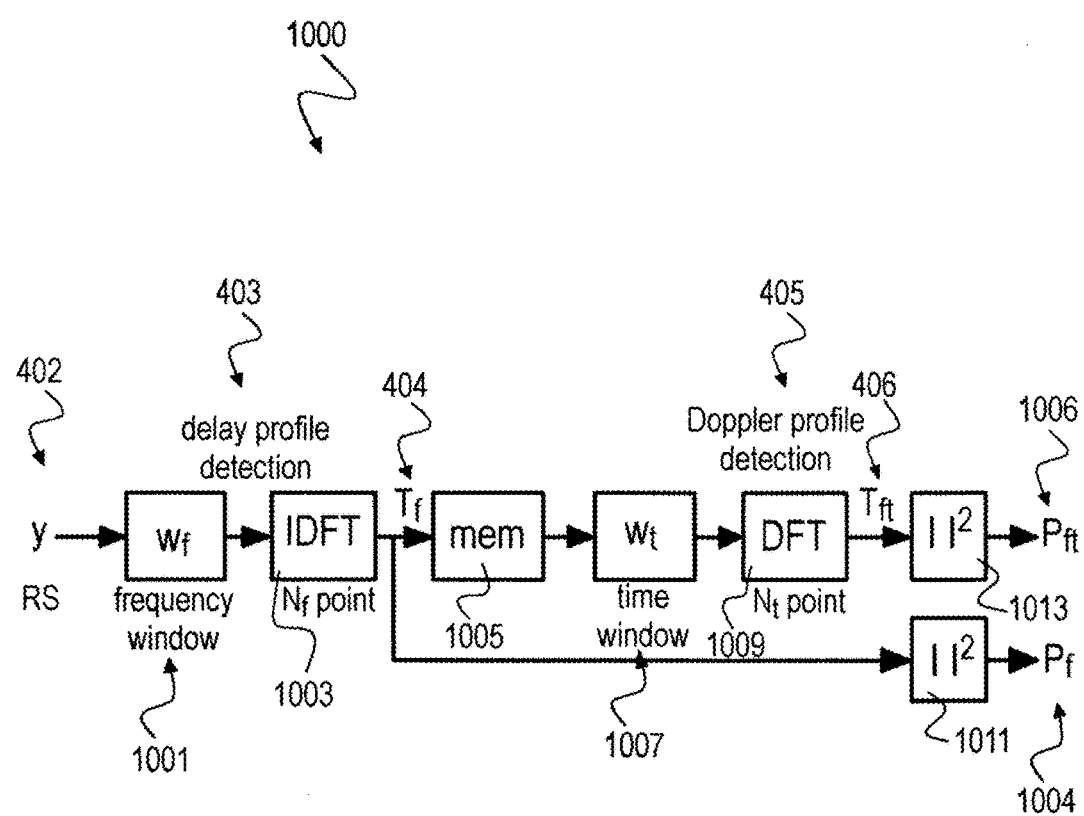
FIG. 10 is a block diagram of an exemplary cluster detection device 1000 as an embodiment of the cluster detection device 400 of FIG. 4.

FIG. 10 is a block diagram of an exemplary cluster detection device 1000 as an embodiment of the cluster detection device 400 of FIG. 4. The cluster detection device 1000 includes a delay profile detector 403, a memory 1005 and a Doppler profile detector 405. The delay profile detector 403 is coupled to a Doppler profile detector 405 by the memory 1005. The delay profile detector 403 includes a frequency window unit 1001 and an IDFT unit 1003. A reference signal y 402 received by the delay profile detector 403 is frequency windowed by the frequency window unit 1001 and transformed by the IDFT unit 1003 into delay domain (corresponding to time domain) to obtain a set of delay profiles $T_f$ 404 which are stored in the memory 1005. A power detector 1011 detects a power of the set of delay profiles 404 based on power averaging to obtain a delay power profile $P_f$.

The Doppler profile detector 405 includes a time window unit 1007 and a DFT unit 1009. A delay profile 404 retrieved from the memory 1005 is time windowed by the time window unit 1007 and transformed by the DFT unit 1009 into Doppler domain (corresponding to frequency domain) to obtain a set of delay-Doppler profiles 406. A power detector 1013 detects a power of the set of delay-Doppler profiles $T_{ft}$ 406 based on power averaging to obtain a delay-Doppler power profile $P_{ft}$.

Both power detectors 1011, 1013 may be implemented in a postprocessor (not depicted in FIG. 10).

In the following an example for performing cluster profile detection is described. Considering the worst case (single antenna, MIMO layer, resource block), the demodulated RS $y_{k,l} = h_{k,l} + n_{k,l}$ sample the sparse channel ($N_c$ clusters with gains $a_c$, delays $\tau_c$, Doppler $f_c$)

$$h_{k,l} = \sum_{c=1}^{N_c} a_c \exp(-j2\pi f_k \tau_c) \exp(j2\pi t_l f_c) \quad \text{(Eq. 1)}$$

at RS positions (k-th subcarrier frequency $f_k$, l-lt OFDM symbol time $t_l$). Small cluster delay/Doppler spreads within a resource block are not modeled but accounted for in sparse CE filtering.

Assuming (without loss of generality) a regular RS pattern, the received RS may be collected per resource block in a matrix $[y_1 \vdots \ldots \vdots y_r]$ with $N_f$ rows (RS per OFDM) and $N_T$ columns (# RS-OFDM). In an exemplary embodiment as described above with respect to FIG. 7, RS vectors $y_1$, $y_2$, ... are processed sequentially based on a) frequency-direction processing and b) time-direction processing.

In frequency-direction processing, from each RS vector y, a 1D delay profile $T_f$ and delay power profile $P_f$ are computed by frequency windowing and transfer to delay domain, i.e., $$T_f = \text{IDFT}(w_f \rho y) \text{ and } P_f = T_f \rho \text{ conj}(T_f) \quad \text{(Eq. 2)}$$

In time-direction processing, from a number $N_t$ of delay profiles $[T_{f,1} \vdots \ldots \vdots T_{f,N_t}]$ accumulated, 2D delay/Doppler profiles $T_{ft}, P_{ft}$ are computed by time windowing and transfer to Doppler domain:

$$T_{ft} = \begin{bmatrix} DFT(w_t^T o(\text{row}_1([T_{f,1} K\ T_{f,N_t}]))) \\ DFT(w_t^T o(\text{row}_{N_f}([T_{f,1} K\ T_{f,N_t}]))) \end{bmatrix} \text{ and} \quad \text{(Eq. 3)}$$

$$P_{ft} = T_{ft} \text{ oconj}(T_{ft})$$

The ability to discriminate between clusters of very different power levels is greatly dependent on windowing, in particular, the window filter stopband response. FIR filters may be designed via power spectrum. In this disclosure, pass- and stopband responses are not specified in terms of signal levels; rather, the passband is reduced to a single point (DC), a stopband frequency $\omega_s$ near DC is defined and the energy is minimized across the entire stopband for any window length N, as described in the following.

Considering symmetric power spectra about DC (shifts in delay/Doppler domains are taken care of by the IDFT/DFT), the window coefficients must be real-valued and symmetric about zero:

$$w^T = [r^T r^T]/\sqrt{2} = [r_L \ldots r_1 \vdots r_1 \ldots r_L]/\sqrt{2}, \quad \text{(Eq. 4)}$$

so it suffices to optimize the length-L=N/2 vector r (N even). From its frequency response $R(\omega) = \sum_{n=1}^{L} r_n 2 \cos([n-1/2]\omega)$, the pass- and stopband energies $E_p = \int_{\omega=0}^{\omega_s} |R(\omega)|^2 d\omega$, $E_s = \int_{\omega=\omega_s}^{\pi} |R(\omega)|^2 d\omega$ are evaluated as $$E_p = r^T P r \text{ with } [P]_{nm} = \quad \text{(Eq. 5a)}$$

$$\begin{cases} \sin(2[n-1/2]\omega_s)/[n-1/2] + 2\omega_s & (m=n) \\ \frac{2\sin((n-m)\omega_s)}{(n-m)} + \frac{2\sin((n+m-1)\omega_s)}{(n+m-1)} & (m \neq n) \end{cases}$$

$$E_s = r^T S r \text{ with } [S]_{nm} = \quad \text{(Eq. 5b)}$$

$$\begin{cases} 2(\pi - \omega_s) - \frac{\sin(2(n-1/2)\omega_s)}{(n-1/2)} & (m=n) \\ -2\frac{\sin((n-m)\omega_s)}{(n-m)} - 2\frac{\sin((n+m-1)\omega_s)}{(n+m-1)} & (m \neq n) \end{cases}$$

Via eigenanalysis $[V,\Lambda] = \text{eig}(S)$ with ascending eigenvalues $\Lambda = \text{diag}(\lambda_1, \ldots, \lambda_L)$, the stopband energy can be expressed as $$E_s(r) = r^T S r = r^T V \Lambda \cdot V^T r = x^T \Lambda x \text{ with } x = V^T r \text{ and } r = V x \quad \text{(Eq. 6)}$$

Observing the constraint $x^T x = 1$, this expression is minimized by choosing $x_{opt} = [1 0 \ldots 0]^T$. Hence, $$E_{s,min} = \lambda_1 \text{ smallest eigenvalue} \quad \text{(Eq. 7a)}$$

$$r_{opt} = v_1 \text{ respective eigenvector} \quad \text{(Eq. 7b)}$$

from which the optimal window coefficients $w_{opt}$ are readily obtained (see Eq. 4).

From each delay/Doppler profile $P_{ft}$ (see Eq. 3), cluster detection postprocessing may determine a set of cluster parameters $\{N_c, p_c, \tau_c, f_c\}$. An exemplary embodiment comprises 1) threshold detection, 2) cluster parameter estimation and 3) an optional plausibility check.

1) threshold detection operates as follows: find entries $\mathbf{P}_{\vartheta} = \arg(P_{ft} > \vartheta_{ft} \max(P_{ft}))$ of $P_{ft}$ above a certain level (threshold $\vartheta_{ft}$ favorably depending on the SNR (e.g., −SNR-10 dB) and also $N_f, N_t$), identify $\hat{N}_c$ regions $\mathbf{P}_{\vartheta,c}$ sufficiently different from one another and (tentatively) declare these as clusters.

2) cluster parameter estimation operates as follows: for each of the $\hat{N}_c$ clusters, estimate its parameters, e.g., by deriving coarse estimates directly from the peaks: $\hat{p}_c = \max(\mathbf{P}_{\vartheta,c})$, $(\hat{\tau}_c, \hat{f}_c) = \arg \max(\mathbf{P}_{\vartheta,c})$, deriving fine estimates from the peak and its neighbors, e.g., by computing the center of gravity or exploiting the known shapes of frequency/time windows (see FIGS. 11, 12).

3) plausibility check (optional) operates as follows: check detection result in order to weed out ghost clusters.

Figure 11A:
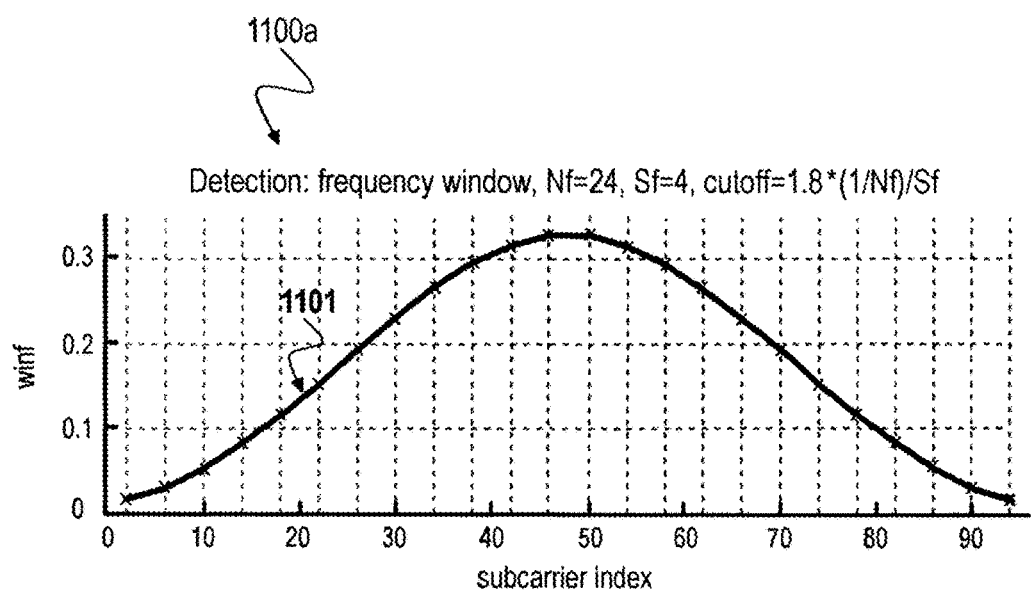
FIG. 11a is a diagram 1100a illustrating exemplary frequency window coefficients 1101 for a frequency window of the cluster detection device of FIG. 10.
Figure 11B:
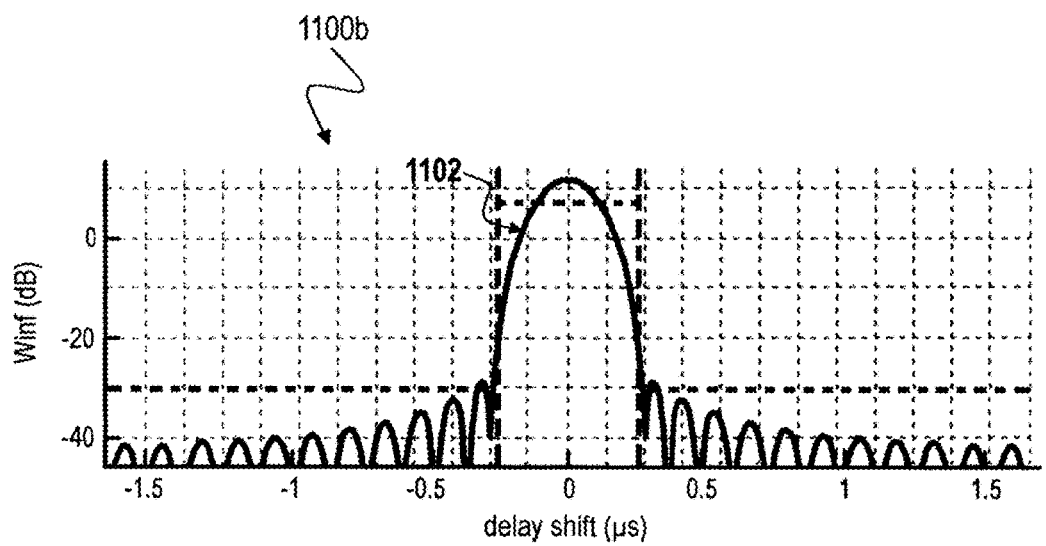
Figure 12A:
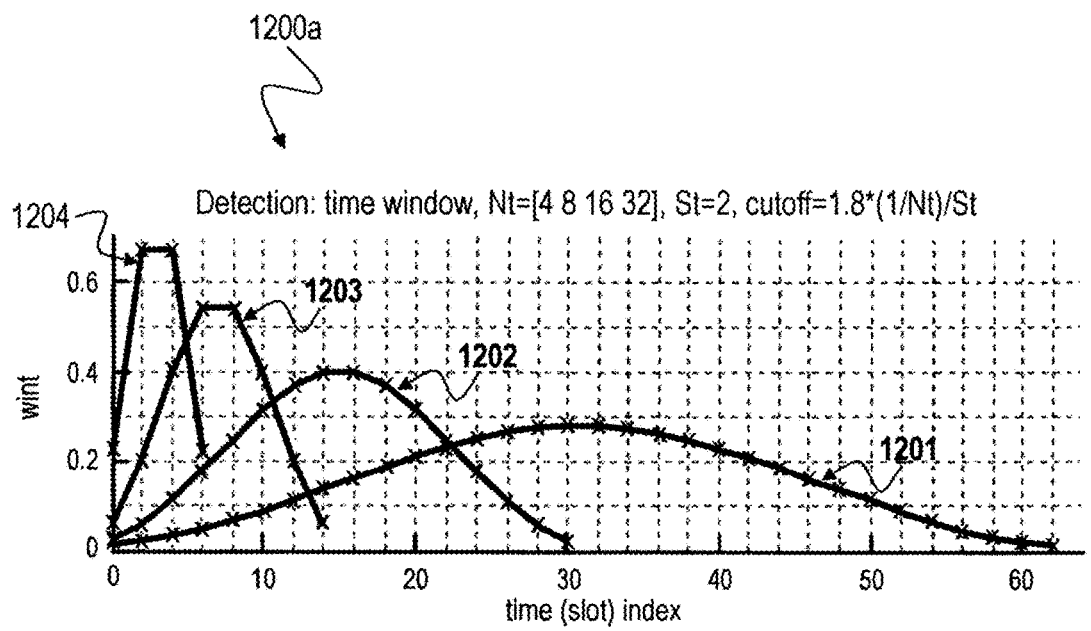
FIG. 12a is a diagram 1200a illustrating exemplary time window coefficients 1201, 1202, 1203, 1204 for a time window of the cluster detection device of FIG. 10.
Figure 12B:
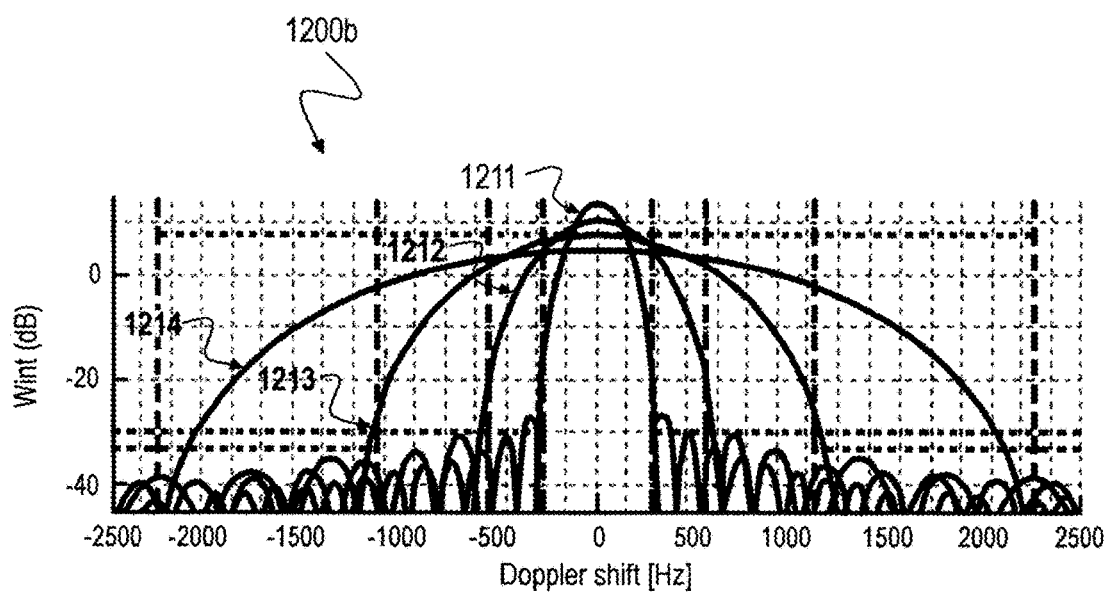
Figure 13:
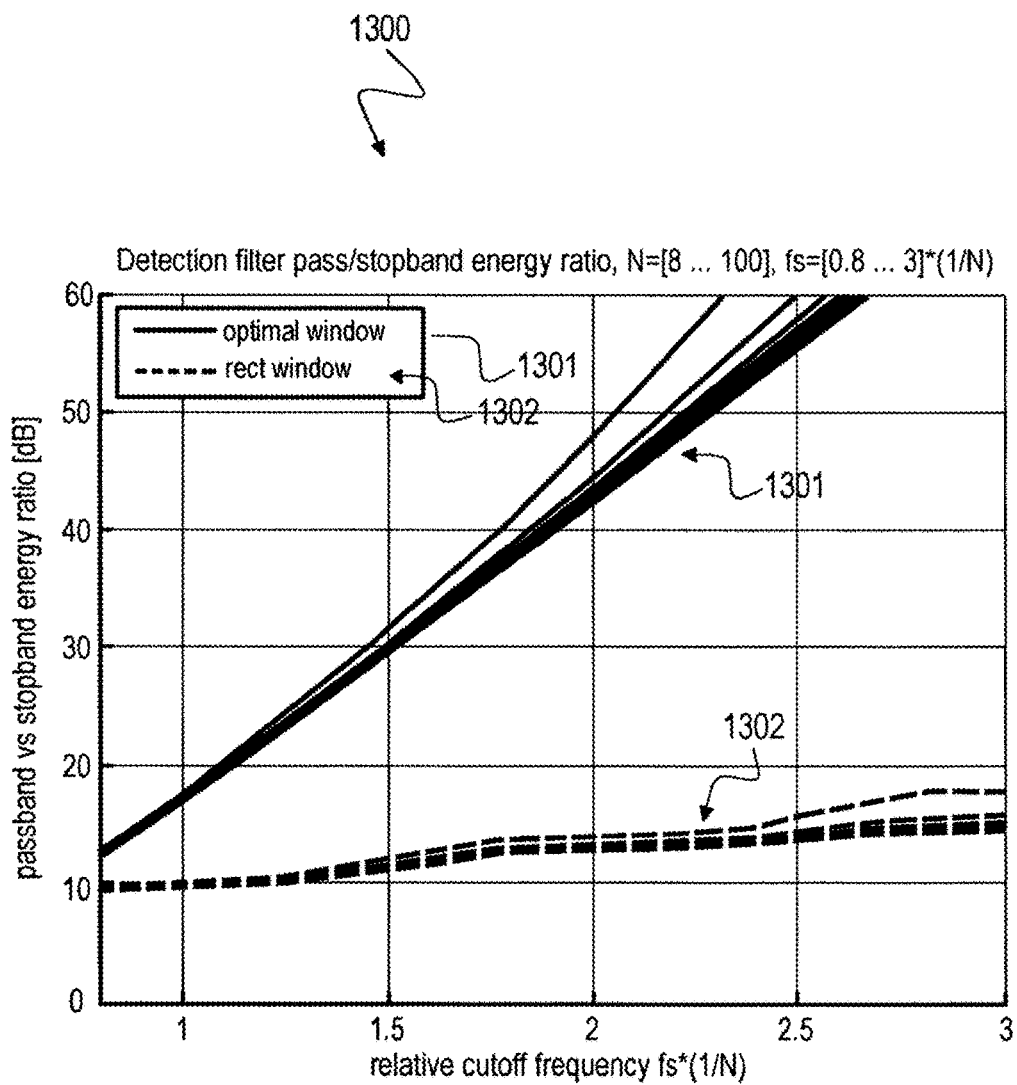
FIG. 13 is a diagram 1300 illustrating pass-/stopband energy ratios for an optimal frequency or time window 1301 according to FIGS. 11a, 11b and 12a, 12b and for a rectangular window 1302.

FIGS. 11, 12 and 13 display optimal frequency- and time window coefficients $w_f, w_t$ and their transfer functions for resource block RS sizes $N_f = 24$, $N_t = \{4, 8, 16, 32\}$, as well as the pass-/stopband energy ratio $E_p/E_s$ versus cutoff frequency $f_s$. Optimal windowing makes $E_p/E_s$ rise steeply with $f_s$ (rect windowing does not) at the expense of a wider main lobe. The choice $f_s = 1.8$/RS spacing was found to be a good tradeoff between main lobe width (<4/RS spacing) and energy ratio (~40 dB). In the outer stopband regions, the attenuation $R(0)/R(\omega)$ is even higher (~50 dB, FIG. 11 left/center), which helps further suppressing crosstalk between clusters spaced farther apart. The frequency- and time window coefficients $w_f, w_t$ may be applied for the frequency window and the time window of the cluster detection device of FIG. 10, e.g. as frequency window for the frequency window unit 1001 and as time window for the time window unit 1007.

Figure 14:
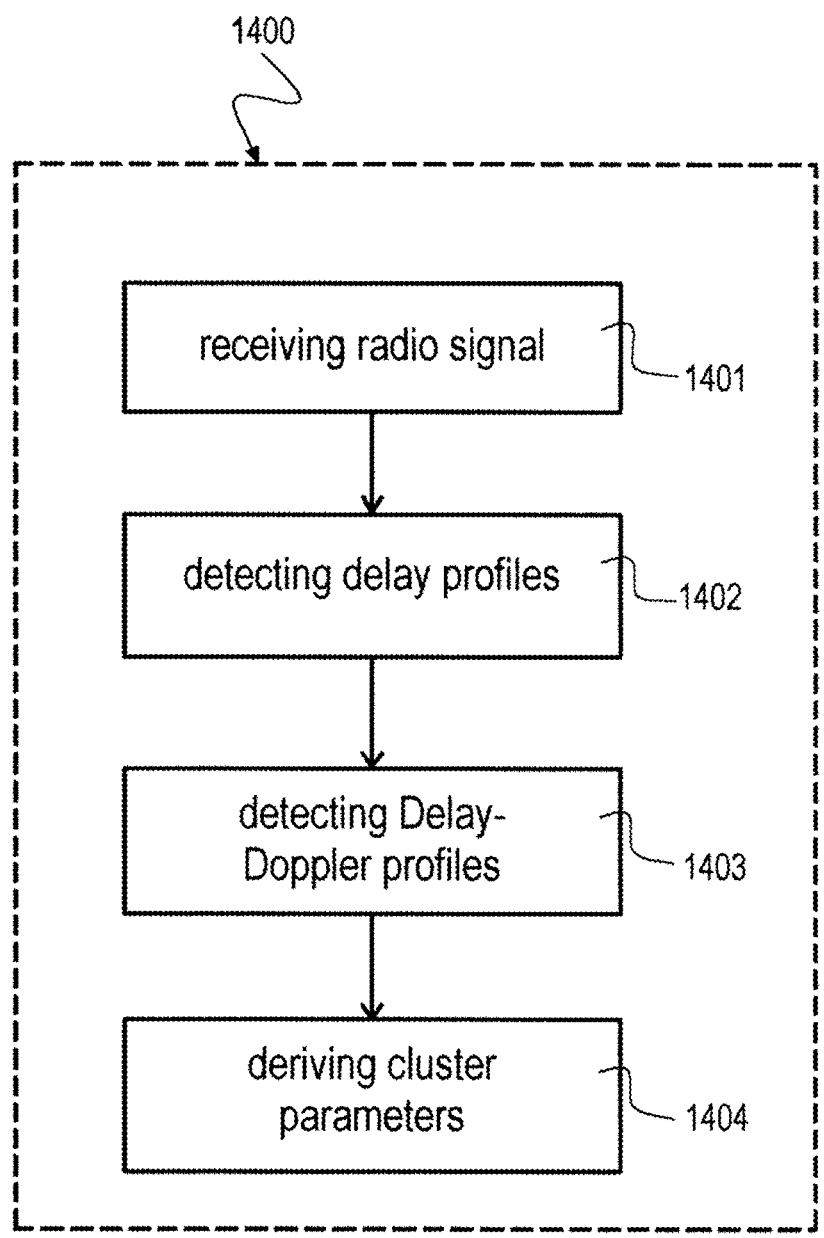
FIG. 14 is a schematic diagram illustrating a method for cluster detection 1400 according to the disclosure.

FIG. 14 is a schematic diagram illustrating a method 1400 for detecting clusters in a beamformed transmission according to the disclosure.

The method 1400 includes receiving 1401 a radio signal comprising time-frequency resources, wherein the time-frequency resources comprise a plurality of reference signals, e.g. as described above with respect to FIG. 4. The method 1400 includes detecting 1402 a set of delay profiles based on frequency-direction filtering of the plurality of reference signals, e.g. as described above with respect to FIG. 4. The method 1400 includes detecting 1403 a set of delay-Doppler profiles based on time-direction filtering of the set of delay profiles, e.g. as described above with respect to FIG. 4. The method 1400 includes deriving 1404 a set of cluster parameters from the set of delay-Doppler profiles, e.g. as described above with respect to FIG. 4.

The frequency-direction filtering 1402 may include Inverse Discrete Fourier Transform (IDFT) filtering the plurality of reference signals. The time-direction filtering 1403 may include Discrete Fourier Transform (DFT) filtering the set of delay profiles.

The method may include windowing the plurality of reference signals by a frequency window before the frequency-direction filtering 1402; and windowing the set of delay profiles by a time window before the time-direction filtering 1403.

The set of cluster parameters may include a number of clusters and for each cluster: a power level, a delay shift and a Doppler shift.

Figure 15:
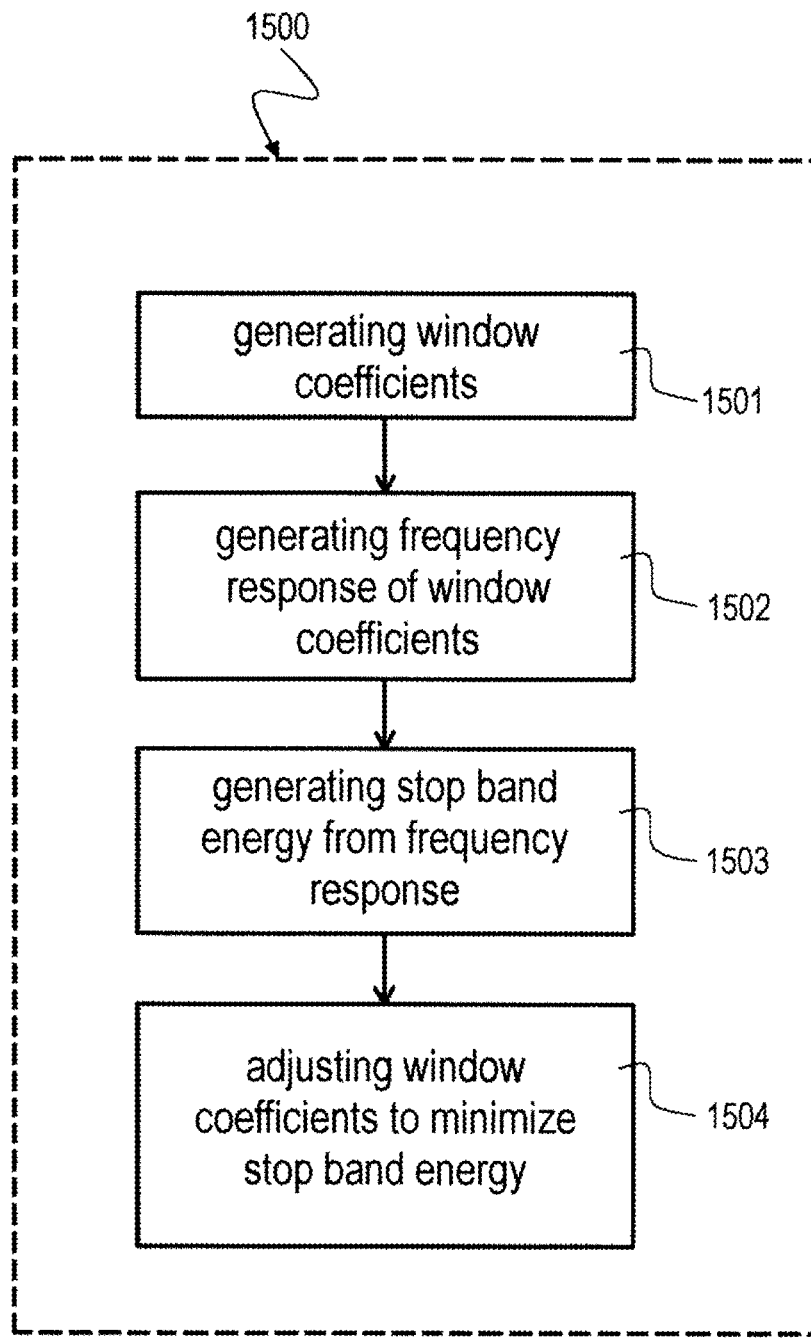
FIG. 15 is a schematic diagram illustrating a method 1500 for generating a window for filtering a plurality of reference signals comprised in a radio signal according to the disclosure.

FIG. 15 is a schematic diagram illustrating a method 1500 for generating a window for filtering a plurality of reference signals comprised in a radio signal according to the disclosure.

The method 1500 includes generating 1501 a set of symmetric real-valued window coefficients around zero, e.g. as described above with respect to FIG. 10. The method 1500 includes generating 1502 a frequency response of the set of window coefficients, e.g. as described above with respect to FIG. 10. The method 1500 includes generating 1503 a stopband energy from the frequency response of the set of window coefficients in a matrix representation, e.g. as described above with respect to FIG. 10. The method further includes adjusting 1504 the set of symmetric real-valued window coefficients such that the stopband energy is minimized, e.g. as described above with respect to FIG. 10.

The method 1500 may further include performing an eigenanalysis of the stopband energy to obtain a set of eigenvalues. The method 1500 may further include deriving optimal window coefficients from a smallest eigenvalue of the set of eigenvalues. The method 1500 may further include receiving a radio signal comprising time-frequency resources, wherein the time-frequency resources comprise a plurality of reference signals; and detecting a set of delay-Doppler profiles in a transmission of the radio signal based on frequency-direction filtering and time-direction filtering of the plurality of reference signals by using the optimal window coefficients.

Figure 16A:
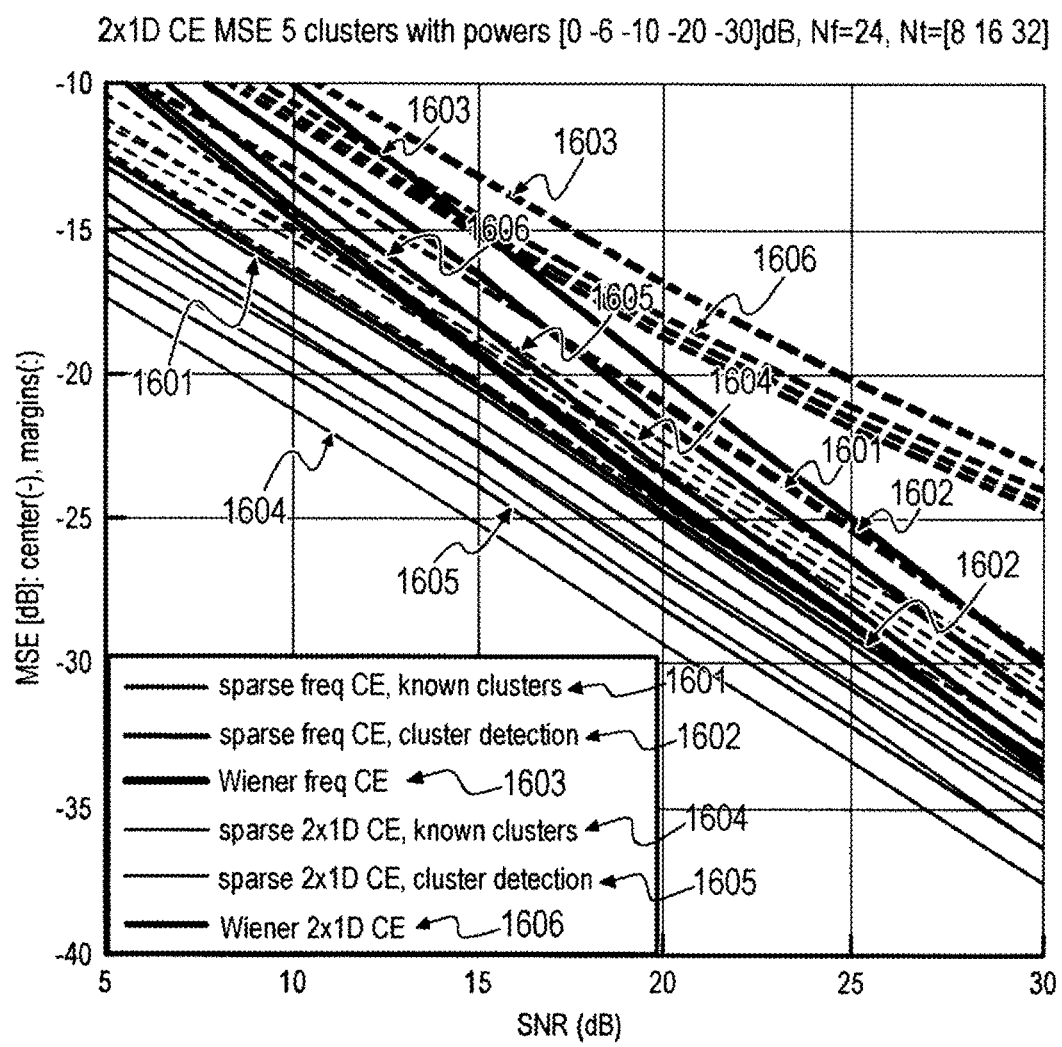
FIGS. 16a, 16b and 16c are performance diagrams 1600a, 1600b, 1600c illustrating the MSE (mean square error) performance for cluster detection and sparse channel estimation according to the disclosure for different clustered channels.
Figure 16B:
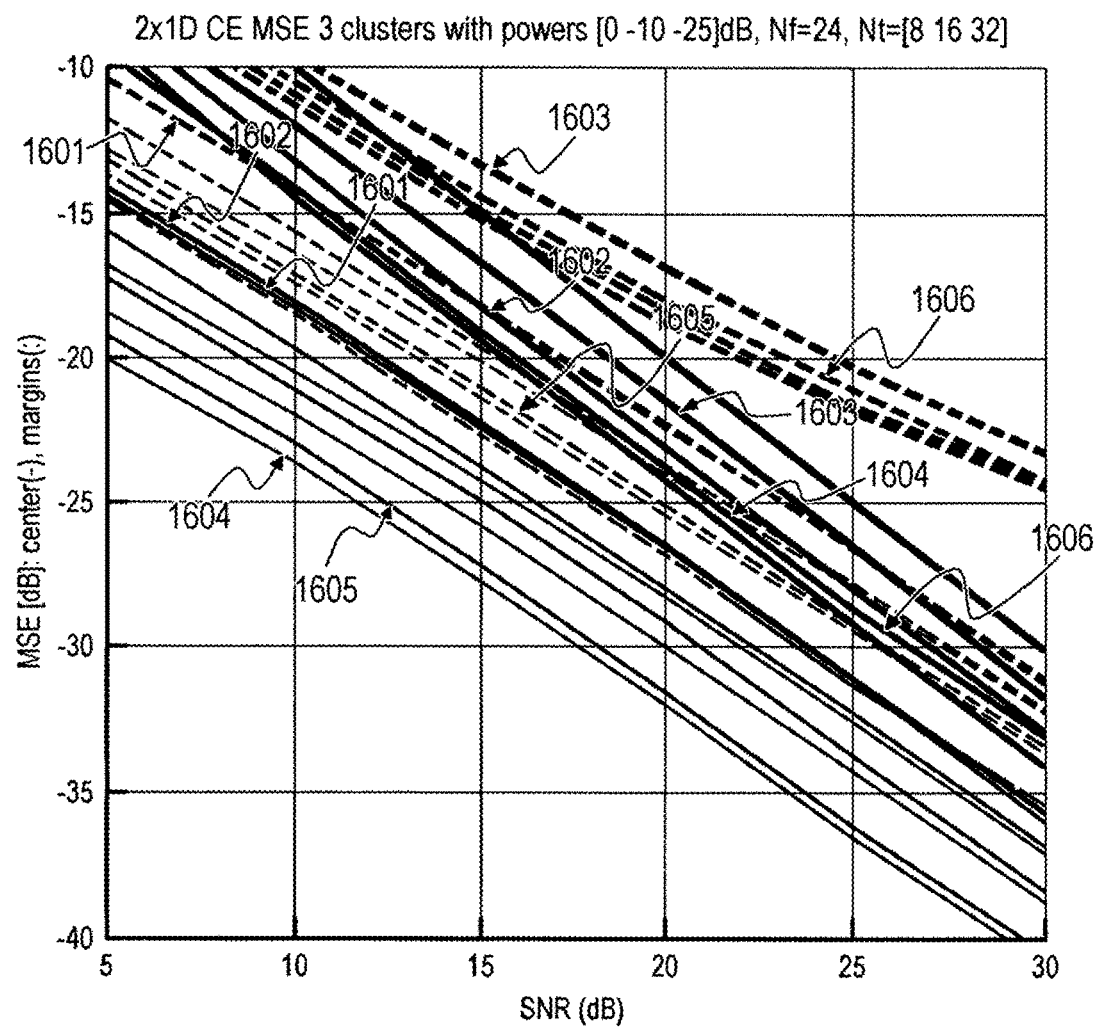
Figure 16C:
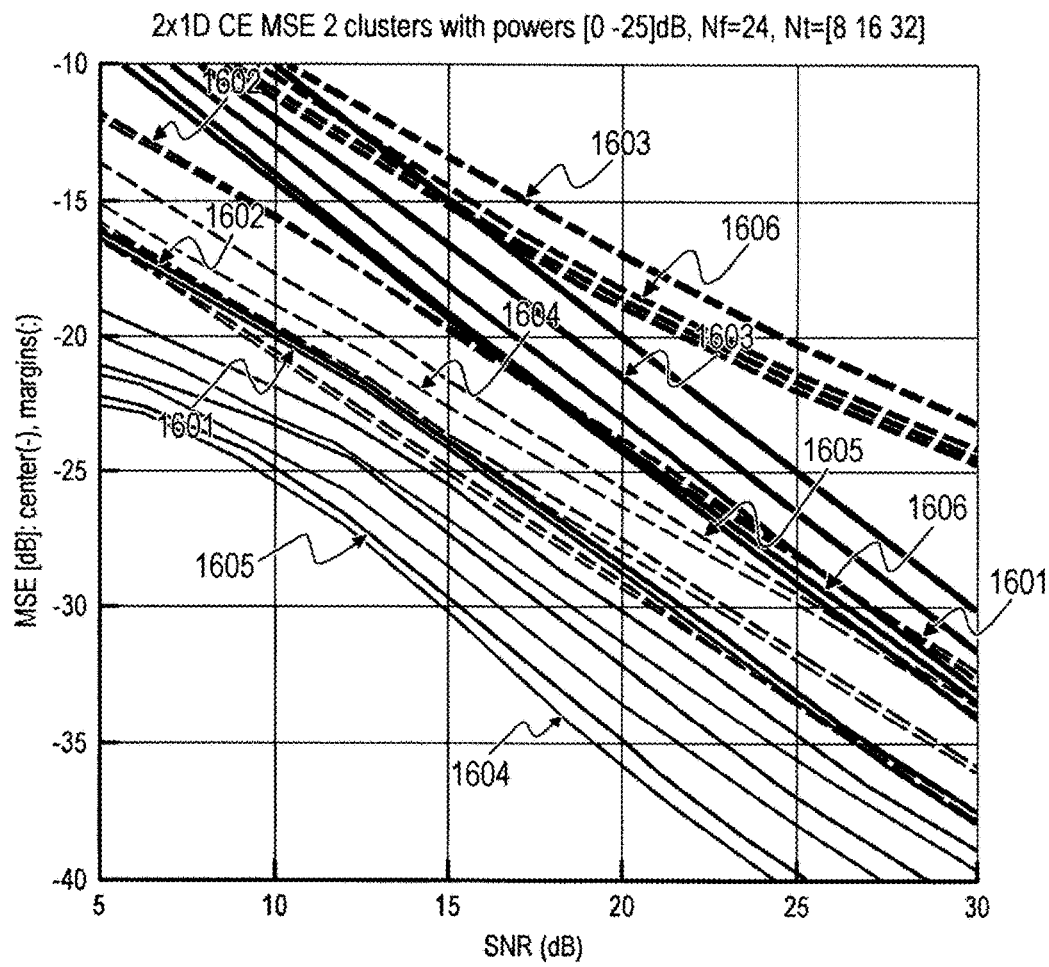

FIGS. 16a, 16b and 16c are performance diagrams 1600a, 1600b, 1600c illustrating the MSE (mean square error) performance for cluster detection and 2×1D sparse channel estimation according to the disclosure for different clustered channels. The number of clusters is Nc=2 (FIG. 16c), 3 (FIG. 16b), 5 (FIG. 16a). Resource block RS sizes are Nf=24 and Nt={1, 8, 16, 32}.

The MSE for cluster detection according to the disclosure is close to that obtained with ideal knowledge of clusters (1D 1602 vs 1601, 2D 1605 vs 1604). 1D sparse frequency filtering (acquisition) is superior to 1D and even 2D Wiener filtering by large margins (up to 8 and 5 dB, respectively). 2D sparse frequency+time filtering (tracking) yields additional gains which are largest for longest time filtering and smallest number of clusters, but sparse CE is still superior for as many as 5 clusters.

Sparse channel estimation benefits from advanced cluster detection in many respects: Channel cluster detection according to this disclosure is close to optimal, given the limited size of the observation (RS symbols). Clusters of large dynamic range (from strong LOS to NLOS well below the noise level) can be identified reliably over the whole SNR range. Cluster detection based on relatively few reference symbols is feasible, enabling fast acquisition via one-shot 1D cluster detection from a single RS-OFDM symbol. This meets the stringent 5G latency requirements and procures initialization of cluster detection tracking. Cluster detection and CE reconfiguration can be activated on demand, i.e., only for those resource blocks whose beam-formed cluster parameters change significantly. Cluster detection is backwards compatible with legacy channel estimation: delay/Doppler spreads can readily be deduced from the detected delay/Doppler channel energy map.

The cluster detection device according to the disclosure provides a reliable cluster detection, i.e. all $N_c$ relevant clusters having an impact on sparse CE performance, including weak clusters (below the noise level) are detected; non-existing or irrelevant clusters (far below the noise level) are rejected; reliable detection over the entire SNR range, in particular, large SNR is achieved.

The cluster detection device according to the disclosure provides an accurate cluster parameter estimation, i.e. power levels $p_c$, delay shifts $\tau_c$, and Doppler shifts $f_c$ of all clusters detected are estimated.

The cluster detection device according to the disclosure can handle dynamic clustering caused by selective beam-forming, UE mobility, and millimeter-wave channel blocking (rapid birth/death of clusters) by adaptive per-resource-block detection using relatively few reference symbols and no or little prior channel information.

The cluster detection device according to the disclosure exhibits low latency and moderate complexity, i.e. not exceeding that of CE filtering.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 1400 and 1500 as described above with respect to FIGS. 14 and 15. Such a computer program product may include a readable storage medium storing program code thereon for use by a processor, the program code comprising instructions for performing any of the method 1400, 1500 blocks as described above.

EXAMPLES

The following examples pertain to further embodiments. Example 1 is a cluster detection device for detecting clusters in a beam-formed transmission, the cluster detection device comprising: a receiver, configured to receive a radio signal comprising time-frequency resources, wherein the time-frequency resources comprise a plurality of reference signals; a delay profile detector, configured to detect a set of delay profiles based on frequency-direction filtering of the plurality of reference signals; a Doppler profile detector, configured to detect a set of delay-Doppler profiles based on time-direction filtering of the set of delay profiles; and a cluster detection postprocessor, configured to derive a set of cluster parameters from the set of delay-Doppler profiles.

In Example 2, the subject matter of Example 1 can optionally include that the delay profile detector comprises an Inverse Discrete Fourier Transform (IDFT) unit to perform the frequency-direction filtering.

In Example 3, the subject matter of Example 2 can optionally include that the Doppler profile detector comprises a Discrete Fourier Transform (DFT) unit to perform the time-direction filtering.

In Example 4, the subject matter of Example 3 can optionally include that the delay profile detector comprises a frequency window unit arranged before the IDFT unit, configured to window the plurality of reference signals by a frequency window.

In Example 5, the subject matter of Example 4 can optionally include that the Doppler profile detector comprises a time window unit arranged before the DFT unit, configured to window the set of delay profiles by a time window.

In Example 6, the subject matter of Example 5 can optionally include that at least one of the time window or the frequency window has a passband defined by a single point at zero and a stopband defined by symmetric real-valued coefficients around the zero.

In Example 7, the subject matter of Example 6 can optionally include that the coefficients of the stopband are configured so as to minimize an energy of the stopband.

In Example 8, the subject matter of any one of Examples 1-7 can optionally include that the Doppler profile detector is configured to iteratively detect the set of delay-Doppler profiles based on at least one iteration of frequency-direction filtered reference signals.

In Example 9, the subject matter of Example 8 can optionally include that in a first iteration the Doppler profile detector is configured to detect the set of delay-Doppler profiles based on a single reference signal.

In Example 10, the subject matter of any one of Examples 1-9 can optionally include a memory, coupled between the delay profile detector and the Doppler profile detector, wherein the memory is configured to store the set of delay profiles.

In Example 11, the subject matter of any one of Examples 1-10 can optionally include that the time-frequency resources are arranged in a plurality of resource blocks and the delay profile detector is configured to process the plurality of reference signals on a resource block basis.

In Example 12, the subject matter of any one of Examples 1-11 can optionally include that the set of cluster parameters comprises a number of clusters and for each cluster: a power level, a delay shift and a Doppler shift.

In Example 13, the subject matter of any one of Examples 1-12 can optionally include that the cluster detection postprocessor comprises a power detector, configured to detect a power of the set of delay-Doppler profiles based on power averaging.

In Example 14, the subject matter of Example 13 can optionally include that the cluster detection postprocessor comprises a threshold detection unit, configured to detect entries of the set of delay-Doppler profiles which are above a threshold.

In Example 15, the subject matter of Example 14 can optionally include that the threshold depends on a signal-to-noise ratio of the set of delay-Doppler profiles.

In Example 16, the subject matter of any one of Examples 14-15 can optionally include that the cluster detection postprocessor is configured to assign the entries of the set of delay-Doppler profiles, which are above the threshold, to clusters.

In Example 17, the subject matter of Example 16 can optionally include that the cluster assignment is based on relative distances of the entries of the set of delay-Doppler profiles which are above the threshold.

Example 18 is a method for detecting clusters in a beamformed transmission, the method comprising: receiving a radio signal comprising time-frequency resources, wherein the time-frequency resources comprise a plurality of reference signals; detecting a set of delay profiles based on frequency-direction filtering of the plurality of reference signals; detecting a set of delay-Doppler profiles based on time-direction filtering of the set of delay profiles; and deriving a set of cluster parameters from the set of delay-Doppler profiles.

In Example 19, the subject matter of Example 18 can optionally include that the frequency-direction filtering comprises Inverse Discrete Fourier Transform (IDFT) filtering the plurality of reference signals; and that the time-direction filtering comprises Discrete Fourier Transform (DFT) filtering the set of delay profiles.

In Example 20, the subject matter of Example 19 can optionally include: windowing the plurality of reference signals by a frequency window before the frequency-direction filtering; and windowing the set of delay profiles by a time window before the time-direction filtering.

In Example 21, the subject matter of any one of Examples 18-20 can optionally include that the set of cluster parameters comprises a number of clusters and for each cluster: a power level, a delay shift and a Doppler shift.

Example 22 is a method for generating a window for filtering a plurality of reference signals comprised in a radio signal, the method comprising: generating a set of symmetric real-valued window coefficients; generating a frequency response of the set of window coefficients; generating a stopband energy from the frequency response of the set of window coefficients in a matrix representation; and adjusting the set of symmetric real-valued window coefficients such that the stopband energy is minimized.

In Example 23, the subject matter of Example 22 can optionally include performing an eigenanalysis of the stopband energy to obtain a set of eigenvalues.

In Example 24, the subject matter of Example 23 can optionally include deriving optimal window coefficients from a smallest eigenvalue of the set of eigenvalues.

In Example 25, the subject matter of any one of Examples 22-24 can optionally include: receiving a radio signal comprising time-frequency resources, wherein the time-frequency resources comprise a plurality of reference signals; and detecting a set of delay-Doppler profiles in a transmission of the radio signal based on frequency-direction filtering and time-direction filtering of the plurality of reference signals by using the optimal window coefficients.

Example 26 is a computer readable non-transitory medium on which computer instructions are stored which when executed by a computer, cause the computer to perform the method of one of Examples 18 to 25.

Example 27 is a device for detecting clusters in a beamformed transmission, the device comprising: means for receiving a radio signal comprising time-frequency resources, wherein the time-frequency resources comprise a plurality of reference signals; means for detecting a set of delay profiles based on frequency-direction filtering of the plurality of reference signals; means for detecting a set of delay-Doppler profiles based on time-direction filtering of the set of delay profiles; and means for deriving a set of cluster parameters from the set of delay-Doppler profiles.

In Example 28, the subject matter of Example 27 can optionally include that the means for frequency-direction filtering comprises means for Inverse Discrete Fourier Transform (IDFT) filtering the plurality of reference signals; and that the means for time-direction filtering comprises means for Discrete Fourier Transform (DFT) filtering the set of delay profiles.

In Example 29, the subject matter of Example 28 can optionally include means for windowing the plurality of reference signals by a frequency window before the frequency-direction filtering; and means for windowing the set of delay profiles by a time window before the time-direction filtering.

In Example 30, the subject matter of any one of Examples 27-28 can optionally include that the set of cluster parameters comprises a number of clusters and for each cluster: a power level, a delay shift and a Doppler shift.

Example 31 is a device for generating a window for filtering a plurality of reference signals comprised in a radio signal, the device comprising: means for generating a set of symmetric real-valued window coefficients; means for generating a frequency response of the set of window coefficients; means for generating a stopband energy from the frequency response of the set of window coefficients in a matrix representation; and means for adjusting the set of symmetric real-valued window coefficients such that the stopband energy is minimized.

In Example 32, the subject matter of Example 31 can optionally include means for performing an eigenanalysis of the stopband energy to obtain a set of eigenvalues.

In Example 33, the subject matter of Example 32 can optionally include means for deriving optimal window coefficients from a smallest eigenvalue of the set of eigenvalues.

In Example 34, the subject matter of Example 32 can optionally include means for receiving a radio signal comprising time-frequency resources, wherein the time-frequency resources comprise a plurality of reference signals; and means for detecting a set of delay-Doppler profiles in a transmission of the radio signal based on frequency-direction filtering and time-direction filtering of the plurality of reference signals by using the optimal window coefficients.

Example 35 is a cluster detection circuit for detecting clusters in a beam-formed transmission, the cluster detection circuit comprising: a receiver circuit, configured to receive a radio signal comprising time-frequency resources, wherein the time-frequency resources comprise a plurality of reference signals; a delay profile detector circuit, configured to detect a set of delay profiles based on frequency-direction filtering of the plurality of reference signals; a Doppler profile detector circuit, configured to detect a set of delay-Doppler profiles based on time-direction filtering of the set of delay profiles; and a cluster detection circuit, configured to derive a set of cluster parameters from the set of delay-Doppler profiles.

In Example 36, the subject matter of Example 35 can optionally include that the delay profile detector circuit comprises an Inverse Discrete Fourier Transform (IDFT) circuit to perform the frequency-direction filtering.

Example 37 is a cluster detection system for detecting clusters in a beam-formed transmission, the cluster detection system comprising: a receiver subsystem, configured to receive a radio signal comprising time-frequency resources, wherein the time-frequency resources comprise a plurality of reference signals; a delay profile detector subsystem, configured to detect a set of delay profiles based on frequency-direction filtering of the plurality of reference signals; a Doppler profile detector subsystem, configured to detect a set of delay-Doppler profiles based on time-direction filtering of the set of delay profiles; and a cluster detection subsystem, configured to derive a set of cluster parameters from the set of delay-Doppler profiles.

In Example 38, the subject matter of Example 37 can optionally include that the delay profile detector subsystem comprises an Inverse Discrete Fourier Transform (IDFT) unit to perform the frequency-direction filtering.

In Example 39, the subject matter of Example 38 can optionally include that the Doppler profile detector subsystem comprises a Discrete Fourier Transform (DFT) unit to perform the time-direction filtering.

In Example 40, the subject matter of Example 39 can optionally include that the delay profile detector subsystem comprises a frequency window unit arranged before the IDFT unit, configured to window the plurality of reference signals by a frequency window.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A cluster detection device for detecting clusters in a beam-formed transmission, the cluster detection device comprising:
   a receiver, configured to receive a radio signal comprising time-frequency resources, wherein the time-frequency resources comprise a plurality of reference signals;
   a delay profile detector, configured to detect a set of delay profiles based on frequency-direction filtering of the plurality of reference signals;
   a Doppler profile detector, configured to detect a set of delay-Doppler profiles based on time-direction filtering of the set of delay profiles; and
   a cluster detection postprocessor, configured to derive a set of cluster parameters from the set of delay-Doppler profiles.

2. The cluster detection device of claim 1,
   wherein the delay profile detector comprises an Inverse Discrete Fourier Transform (IDFT) unit to perform the frequency-direction filtering.

3. The cluster detection device of claim 2,
   wherein the Doppler profile detector comprises a Discrete Fourier Transform (DFT) unit to perform the time-direction filtering.

4. The cluster detection device of claim 3,
   wherein the delay profile detector comprises a frequency window unit arranged before the IDFT unit, configured to window the plurality of reference signals by a frequency window.

5. The cluster detection device of claim 4,
wherein the Doppler profile detector comprises a time window unit arranged before the DFT unit, configured to window the set of delay profiles by a time window.

6. The cluster detection device of claim 5,
wherein at least one of the time window or the frequency window has a passband defined by a single point at zero and a stopband defined by symmetric real-valued coefficients about the zero.

7. The cluster detection device of claim 6,
wherein the coefficients of the stopband are configured so as to minimize an energy of the stopband.

8. The cluster detection device of claim 1,
wherein the Doppler profile detector is configured to iteratively detect the set of delay-Doppler profiles based on at least one iteration of frequency-direction filtered reference signals.

9. The cluster detection device of claim 8,
wherein in a first iteration the Doppler profile detector is configured to detect the set of delay-Doppler profiles based on a single reference signal.

10. The cluster detection device of claim 1, comprising:
a memory, coupled between the delay profile detector and the Doppler profile detector, wherein the memory is configured to store the set of delay profiles.

11. The cluster detection device of claim 1,
wherein the time-frequency resources are arranged in a plurality of resource blocks and the delay profile detector is configured to process the plurality of reference signals on a resource block basis.

12. The cluster detection device of claim 1,
wherein the set of cluster parameters comprises a number of clusters and for each cluster: a power level, a delay shift and a Doppler shift.

13. The cluster detection device of claim 1, wherein the cluster detection postprocessor comprises:
a power detector, configured to detect a power of the set of delay-Doppler profiles based on power averaging.

14. The cluster detection device of claim 13, wherein the cluster detection postprocessor comprises:
a threshold detection unit, configured to detect entries of the set of delay-Doppler profiles which are above a threshold.

15. The cluster detection device of claim 14,
wherein the threshold depends on a signal-to-noise ratio of the set of delay-Doppler profiles.

16. The cluster detection device of claim 14,
wherein the cluster detection postprocessor is configured to assign the entries of the set of delay-Doppler profiles, which are above the threshold, to clusters.

17. The cluster detection device of claim 16,
wherein the cluster assignment is based on relative distances of the entries of the set of delay-Doppler profiles which are above the threshold.

18. A method for detecting clusters in a beamformed transmission, the method comprising:
receiving, by a receiver, a radio signal comprising time-frequency resources, wherein the time-frequency resources comprise a plurality of reference signals;
detecting, by a delay profile detector, a set of delay profiles based on frequency-direction filtering of the plurality of reference signals;
detecting, by a Doppler profile detector, a set of delay-Doppler profiles based on time-direction filtering of the set of delay profiles; and
deriving, by a cluster detection postprocessor, a set of cluster parameters from the set of delay-Doppler profiles.

19. The method of claim 18,
wherein the frequency-direction filtering comprises Inverse Discrete Fourier Transform (IDFT) filtering the plurality of reference signals; and
wherein the time-direction filtering comprises Discrete Fourier Transform (DFT) filtering the set of delay profiles.

20. The method of claim 19, comprising:
windowing the plurality of reference signals by a frequency window before the frequency-direction filtering; and
windowing the set of delay profiles by a time window before the time-direction filtering.

21. The method of claim 18,
wherein the set of cluster parameters comprises a number of clusters and for each cluster: a power level, a delay shift and a Doppler shift.

* * * * *